Figure 1:
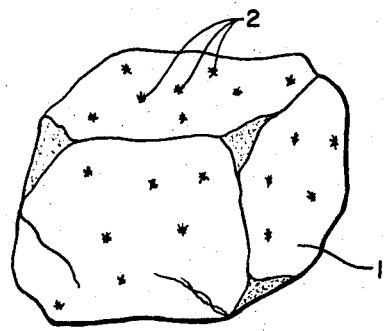

Oct. 1, 1968  E. W. HAYCOCK ETAL  3,404,076
ELECTROLYTIC PREPARATION OF HYDRIDES
Filed April 15, 1965

INVENTORS:
E. W. HAYCOCK
P. R. RHODES
BY: Joseph L. Strabala
THEIR ATTORNEY

United States Patent Office 3,404,076
Patented Oct. 1, 1968

3,404,076
ELECTROLYTIC PREPARATION OF HYDRIDES
Ernest W. Haycock, El Cerrito, and Peter R. Rhodes, San Francisco, Calif., assignors to Shell Oil Company, New York, N.Y., a corporation of Delaware
Filed Apr. 15, 1965, Ser. No. 448,475
13 Claims. (Cl. 204—101)

This invention relates to the preparation of hydrides of various elements directly from the elemental state by an electrolytic process and more particularly, to a method by which the hydrides can be prepared simply in an electrolytic cell.

With the progression of organic synthesis, the hydrides of the various elements and in particular, those of phosphorus (phosphine), have become of greater and greater interest. Other hydrides, such as those of boron, silicon and tellurium, are also of interest. However, since many of these hydrides are unstable, they are difficult to prepare and chemists have searched for a simple, economic way of preparing the more unstable hydrides, such as those of phosphorus. Fairly stable hydrides are those of ammonia and hydrogen sulfide which are easy to prepare. The other more important hydrides are those of the elements in Group V of the Periodic Table, specifically phosphine, arsine, stibine and bismuthine which are much more difficult to prepare than ammonia. While these compounds are often referred to as hydrides, the name may be inappropriate because of the highly positive nature of the hydrogen atom and, as would be expected, the more stable hydrides are the most easily formed. However, the various hydrides differ substantially in their chemical and physical properties.

Ammonia, for example, can be prepared by the direct union of nitrogen with hydrogen, while the hydrides of boron, phosphorus and silicon cannot be prepared by this technique because of their unstable character.

A general method for the preparation of hydrides, especially those of the elements in Group V of the Periodic Table, is by hydrolysis of their binary metal compounds. For example, hydrolysis of magnesium nitride forms ammonia, and likewise, sodium arsenide will undergo hydrolysis to form arsine. Ammonia can also be prepared by the direct combination of hydrogen and nitrogen under certain reaction conditions. While it is possible to form some of the more stable hydrides in this manner, the conditions under which the hydrolysis occurs or direct union takes place are such that the toxic hydrides and their by-products may form explosive mixtures or suffer degradation.

Similarly, the hydrides of boron and silicon can be prepared by the reactions of acids on their magnesium compound, i.e., magnesium boride and magnesium silicide. However, both these compounds are rather unstable and decompose readily after their formation. The hydride of sulfur (hydrogen sulfide) is more easily prepared and analogous to that of ammonia where hydrogen will react with the elemental sulfur. The hydride of tellurium can also be prepared by the direct contact of the element with hydrogen, but this hydride readily decomposes above 0° C. Phosphine may be prepared by the thermal decomposition of the lower oxy-acid of phosphorus and/or their salts. Like many of the above processes for forming the other hydrides, the yields of phosphine are poor and conditions used in the reaction are difficult to employ commercially.

Because of the difficulties noted above, various electrolytic methods have been sought for preparing the hydrides without success, particularly those of the more highly electrically resistant elements such as phosphorus, antimony and boron. In 1863, Grove disclosed an electrolytic method for preparing phosphine by passing an electric current through moist phosphorus (J. Chem. Soc., 16, 263, 1863). Yields of phosphine were poor because of the high electrical resistance of phosphorus and phosphine which necessitated the use of rather high voltages to achieve the necessary current densities. Apparently, the water used to moisten the phosphorus contained a salt and served as the electrolyte.

U.S. Patent No. 1,375,819, issued to Blumenburg, disclosed a method for preparing the hydrides of phosphorus and antimony by adding their compounds to an aqueous electrolyte and passing current therethrough. While such a technique yields small amounts of these hydrides, a considerable number of by-products are also formed at the same time and separation of the gaseous hydrides from the gaseous effluents of such a system is a difficult task, not conveniently adaptable to the commercial production of hydrides.

More recently, U.S. Patent 3,109,787, issued to Price et al., discloses the preparation of the hydride of phosphorus (phosphine) by an electrolytic process using elemental white phosphorus. Like the early work done by Grove, this system uses an aqueous electrolyte, and, preferably, phosphorus in a molten condition. Specifically, the process discloses the contacting of elemental phosphorus of an electrolytic cell at the cathode surface to effect the preparation of phosphine wherein the cathode is a metal having a high hydrogen over-voltage. This patent indicates that the phosphorus should be in a molten state in the prefered practice of the method and uses a mercury cathode in a rather complex electrolytic cell.

As pointed out above, numerous methods are available for the production of hydrides and depending upon the particular hydride desired and its chemical properties, the proper preparation is selected. However, with the possible exception of ammonia and hydrogen sulfide, the preparations of the other hydrides by the known processes noted above are not entirely satisfactory; especially when the more unstable hydrides are prepared. Techniques using molten materials and/or involving highly exothermic reaction conditions will often cause hydride decomposition as rapidly as it is generated. Since all of the above-mentioned processes are generally inflexible and inefficient, they are unsuitable for the economic preparation of hydrides for commercial purposes.

Many of the difficulties experienced with prior processes used for the preparation of hydrides can be overcome by the practice of this invention, which broadly encompasses the preparation of hydrides directly from the elements forming the desired hydride through the use of a particlized electrode having the desired element clinging to surfaces, surface location or sites on the individual electrode particles. More specifically, this invention involves a method whereby hydrides of elements forming the same are prepared by dispersing the elements as isolated crystallitic sites on conductive electrode particles, subsequently forming a slurry with these particles in an electrolyte and thereafter flowing said particles against the cathode of an electrolytic cell with current passing therethrough. Actually, in the simplest embodiment it is only necessary to place the slurry in an electrolytic cell and agitate it so that the electrode particles will come into contact with the cathode of the cell.

Preparation of hydrides, according to this invention, allows them to be prepared under mild reaction conditions, as well as providing a source of relatively pure hydrides. Also, this technique can be carried out at high current densities and low voltages since the circulation of the slurry tends to allow the pockets of the hydride gas forming to escape from the slurry which is desirable because its presence increases the electrical resistance of the slurry appreciably.

Figure 2:
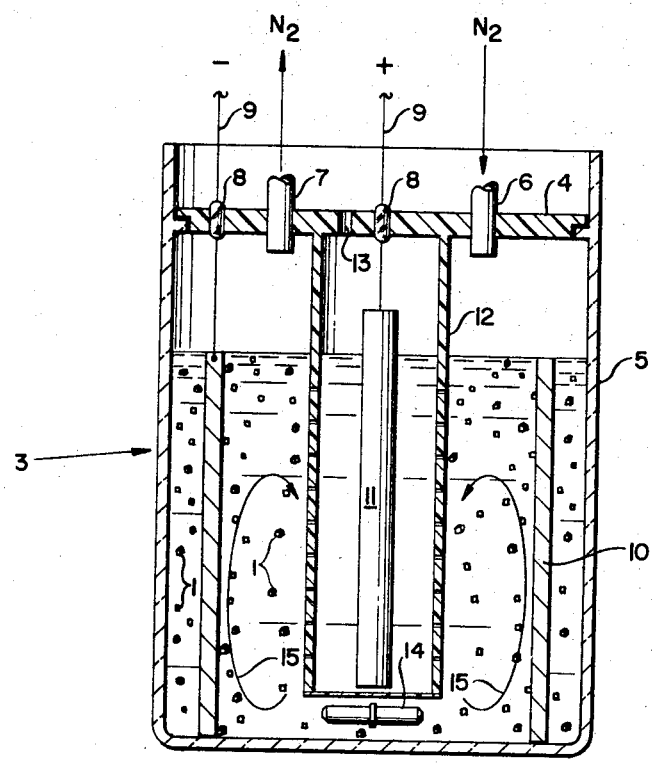

In the drawing:
FIGURE 1 is an elevation of a conductive electrode particle illustrating the small crystallitic sites of an element thereon; and FIGURE 2 is a vertical section of a simple electrolytic cell adapted to be employed in the practice of this invention and which is helpful in explaining the operation of the invention.

In this new electrolytic method of preparing hydrides, the improved results over the prior art are obtained by the use of particlized electrode particles which are themselves conductive. These particles are circulated through a cell while slurried with an electrolyte and when they contact the parent electrode and/or the counter electrode of the cell, they may become electrically conductive. The individual particles function as a portion of the electrodes as long as this contact exists. While particlized electrodes are not generally new, the technique of this invention is different in that the material to undergo electro-chemical reaction is dispersed in small isolated crystallitic sites on the individual electrode particles making up the particlized electrode.

More specifically in the practice of this invention, the individual conductive particles have small isolated crystallitic sites of the materials undergoing electro-chemical reaction dispersed on their surfaces. This can be better understood by referring to FIGURE 1 showing a single electrode particle 1. Particles like electrode particle 1 can be prepared from numerous conductive materials by comminuting them to a finely divided state and in most cases, it is desirable to have electrode particles which have somewhat porous and/or irregular surfaces so that materials to undergo electro-chemical reactions will stick more readily on the surfaces of the individual particles. An example of conductors suitable for the electrode particles is carbon since it inherently has such qualities. However, finely divided metals having a high hydrogen over-voltage, such as platinum, are very satisfactory. Selection of the conductor for the electrode particles may be instrumental in achieving the most efficient operation of the process.

The size of the electrode particles useful in the process will be determined largely by the dynamics of the cell to be used and the viscosity of the slurry of the electrode particles and the electrolyte. Generally as this viscosity increases, the particle size of the individual electrode particles can increase to some extent.

Once the particles of the desired size are obtained, the first step of the process can be undertaken. Since particle contact with the cathode is desired, size control will be determined by the conditions and adjusted to achieve the greatest contact. In one method the prepared particles are first contacted with a solution containing the element of the desired hydride, such as by immersing the particles therein. Thereafter, if this technique is used, the solution is evaporated so as to leave the one dissolved element dispersed on the surfaces of the individual electrode particle as small isolated crystallitic sites 2 (crystallites). The number of these isolated crystallitic sites 2 will depend, in large measure, upon the concentration of the element in the solution in which the electrode particles were immersed; in higher concentrations the sites may fuse into layers.

This step of the process would be carried out when phosphine is to be prepared by dissolving phosphorus in carbon disulfide and then slurrying the electrode particles in the carbon disulfide/phosphorus solution. Thereafter, the carbon disulfide would be evaporated leaving the phosphorus sites or layers sticking to the surfaces of the several electrode particles. Similarly, the hydrides of other compounds could be prepared by dispersing them on the electrode particles in some like fashion. Various solvents can be used depending upon the particular element and/or vapor deposition of the element directly on the particles would afford an alternative method forming the isolated layers or sites on the individual electrode particles. Clearly, it is not important how these layers or sites are formed on the individual particles, but it is necessary that this be accomplished to practice this invention. There are alternate techniques by which the crystallites may be formed on the individual electrode particles, and persons skilled in the art can employ the same.

It is through this technique that large surface areas are achieved for the electro-chemical preparation of hydrides, as well as providing sufficient concentrations of the element's atoms for direct conversion to its hydride. Since many elements forming hydrides do not form ions, for example, elemental phosphorus and boron, and are generally non-conductive in a general sense, it is through the novel technique of dispersing specks or layers of these elements on electrode particles that the elements can conveniently and effectively be electro-chemically converted to their hydrides. Obviously, the individual conductivity of the various elements differ and some are more conductive than others, but this technique is broadly applicable since it offers good dynamic control of reaction conditions.

Over-voltage control is an important feature of this invention in that the electrode particles may be selected from conductors having high hydrogen over-voltage to prevent the evolution of hydrogen at the cathode, which is a competing cathode reaction. This flexibility makes the method applicable to the conductive elements as well as the more non-conductive elements since greater dynamic control of the reaction is possible. Of course, it is more applicable to the less conductive elements, such as phosphorus, since it provides necessary electron transfer in the elements of this type which is not possible to an appreciable degree with particles of the pure element in a cell.

After dispersing the specks or layers of the element on the electrode particles, a slurry is formed with these loaded particles in a suitable electrolyte. Any electrolyte which is non-reactive with the products and reactants in the system is suitable. It is possible to utilize the hydride prepared in the electrolyte by having present materials which will react with the hydride as it is formed. Such materials can be organic or inorganic depending on what is the desired product. However, it should be noted that the electrolyte must be one which is capable of providing hydrogen ions under electrolysis which makes water a very suitable liquid from which to prepare the electrolyte if the hydride is non-reactive with the water. Suitable electrolytes include aqueous solutions of oxy-anions of the element to be converted to its hydride, hydrochloric acid, sulfuric acid, other inorganic acids, acetic acid as well as other organic acids which have a good disassociation factor and the aqueous solutions of the compounds of the alkaline and alkali earth metals, and particularly, those of the halides. Actually, mixtures of these electrolytes may be employed and it is relatively apparent that the particular electrolyte selected is not generally critical, but certain electrolytes can be advantageous in some instances. Actually in some cases, it will not be possible to use an aqueous electrolyte because of the high reactivity of the hydride with water. Other more suitable electrolytes must be selected, under such circumstances.

Depending upon the size of the electrode particle, it may be desirable to increase or decrease the viscosity of the electrolyte in order to obtain more stable suspensions of the particles when operating with large size particles. While it is not necessary to obtain stable suspensions, if the suspension is not semi-stable the particles may be difficult to handle within the cell and electrode-electrode particle contact may be impaired. However, this can sometimes be corrected by the use of various pumping devices and stirring mechanisms. Generally, the concentration of the electrode particles in the slurry can vary widely and it is possible to increase the concentration of the electrode particles in the slurry to the point that it forms a rather viscous mud-like slurry. Such a viscous mud-like slurry can be circulated through an electrolytic cell in a manner that the individual particles come in contact with the cathode of the cell.

The particular concentration of the electrode particles and their method of contacting the electrode is largely an engineering problem which can be solved by those skilled in such an art. These features do not limit the invention and it is obvious that a larger number of particles tend to provide greater surface areas and a higher total concentration of the element of the hydride to be prepared. A small amount of experimentation will generally result in the best operating conditions for the hydride of a particular element.

In order that the invention can be more easily understood, reference is made to FIGURE 2, showing a vertical section of a simple electrolitic cell 3. Cell 3 is a beaker-shaped cell having a lid 4 fitted in the top of its beaker-shaped body 5. Lid 4 has a plurality of holes for the electrical connections and a purge system. Since, in most cases, it will not be desirable for the prepared hydride to mix with oxygen, a system can be conveniently purged with nitrogen and tubular inlet 6 and outlet 7 for the nitrogen purge system to pass axially through lid 4. Fitted into two other holes in the lid 4 are insulator 8 through which wires 9 are passed to provide the current source for the electrode elements below the lid.

Before the lid 4 is placed in position in the mouth of the beaker-shaped body 5 of the cell 3, a cylindrical carbon electrode 10 is fitted into the bore of the beaker-shaped body 5. Generally the cylindrical carbon electrode 10 will be slightly smaller than the inside bore of the beaker-shaped body 5. The cylindrical carbon element 10 need not be carbon but can be formed of almost any conductive material, especially metals having a high hydrogen over-voltage are entirely suitable. Electrode 10 is connected to one of the wire leads 9 passing into insulator 8 in the lid 4 and functions as the cathode of the cell.

Coaxially disposed with the carbon cylinder and extending downwardly therethrough is a counter electrode 11 which can be a carbon rod or, more preferably, a zinc element or the like to prevent the evolution of oxygen at the counter electrode when it issued as the anode. Generally, 30 it is desirable to avoid mixing the hydride with oxygen produced at the anode which can also be accomplished with a diaphram, such as the diaphram 12 in FIGURE 2, which surround the top counter electrode 11 and extends downwardly to shroud the electrode. Barriers of this type are known and isolates the gas evolving at the anode and rising up the diaphram 12 where it can leave the cell through vent 13. The counter electrode 11 which functions as the anode of the system shown in FIGURE 2 is likewise connected to one of the wires 9 passing through insulator 8 in lid 4 of the cell. A magnetic stirrer capsule 14 is placed in the bottom of the cell below the cylindrical electrode 11 and thereafter the slurry of electrode particles and electrolyte are added to the cell and the lid is placed thereon to close the top of cell 3. Actually, it should be appreciated that common electro-chemical techniques can be employed to keep the gaseous oxygen from mixing with the hydride gas, such as the use of porous diaphrams and the like which can isolate the anode from the electrode particles as well. The simple cell 3 would not be satisfactory for commerical units though it is adequate to illustrate the method and techniques of this invention.

In the operation of cell 3, the nitrogen purge is started to remove the oxygen from above the electrolytic solution except within diaphram 12, and is continued during the operation of the cell. Of course, since the cell 3 is continuously purged, it is necessary to separate the gaseous hydride from the nitrogen. After a suitable current is applied to the electrodes 10 and 11 of the cell, the cell 3 is placed over a driven magnetic head which causes the magnetic stirrer capsule 14 to rotate. The rotation of this stirrer capsule 14 generally causes a general flow pattern in the cell as indicated by arrows 15 in the electrolyte. As can be seen by circulation pattern, the electrode particles 1 suspended in the slurry will contact with cylindrical electrode 10 (the cathode) and they themselves become conductive. Since there is current passing through the cell at this juncture and the particles are surrounded by electrolyte, their contact with the cathode will allow the elements forming the crystalline sites or specks on the individual electrode particles to undergo an electro-chemical reaction in the presence of hydrogen which tends to accumulate at or near the cathode (electrode 10). This reduction of the element on the surface of the individual electrode particles will usually produce the hydride of the element which leaves the slurry as a gas being taken up in the nitrogen purge leaving outlet 7 after it is freed from the slurry. In a commercial unit, it would not be necessary to purge with nitrogen if the cell is properly designed to keep the oxygen produce separate from the hydride.

When using aqueous electrolytes, oxygen formed at the anode necessitates the use of a diaphram or barrier, but in some ebmodiments of the invention it is not needed, such as when a zinc anode is anodically dissolved to form a zinc salt.

The following examples are intended to be illustrative of this new method of preparing hydrides but is not intended to limit it in any way.

EXAMPLE I.—PREPARATION OF PHOSPHINE

In order to demonstrate the operability of the process, an experiment was carried out using white phosphorus and carbon particles as the electrode partcles. To achieve the phosporus sites on the carbon particles, 150 grams of carbon black was mixed with 30 grams of white phosphorus in 20 cc. of carbon disulfide. Thereafter, the carbon disulfide was evaporated and the resulting intimate mixture of carbon loaded with white phosphorus sites dispersed on their surfaces was formed. These particles were then used to make a thick paste with 3 molar phosphoric acid.

During the preparation of the paste, an excess of acid was added to control the spontaneous combustion and in order to restore the paste consistency to the slurry, an additional 450 grams of carbon black which was not loaded to the phosphorus sites was added. In the resulting paste, it was calculated that it contained approximately 5% by weight of phosphorus distributed on the surfaces of one-fourth the carbon particles as dispersed crystallitic sites.

After the paste has been prepared, it was diluted with 1 molar sodium chloride solution to a consistency of a thixotropic mud which could be conveniently stirred. This mud was used in a simple cell such as that shown in FIGURE 2 and the continuous generation of phosphine was achieved. The cell described was operated for approximately two hours at a current density of 0.5 ampere.

While the present example was limited to the preparation of phosphine, the hydrides of other materials can be prepared in a similar fashion. Further, it can be seen that the technique employed by this invention is a simple, straight forward method which may be easily used in commercial operations. It seems reasonable that with the proper choice of electrolyte, optimum element/electrode particle loading ratio and the use of a high hydrogen over-voltage charge distributing parent electrode that the efficiency of the preparation of hydrides could lead to new low-cost, commercial manufacture of these materials. Of course, choice of temperature, surface treatment, state of sub-division, etc., are important and can be varied by those skilled in the art to improve yields.

While the specification has referred to the distribution of the element on the conductive particles as sites, layers, crystallites and crystallitic sites, these are not intended to exclude non-crystalline or the non-crystalline forms of elements in the general sense.

We claim as our invention:

1. An improved electro-chemical process for preparing a hydride of an element directly from the element comprising:
   (a) distributing the substantially pure element on the surfaces of finely divided electrically conductive particles;
   (b) slurrying the resulting element-ladened particles with an electrolyte capable of furnishing hydrogen ions;
   (c) passing a direct current through the resulting slurry of said element-ladened particles and said electrolyte through electrode elements;
   (d) agitating said resulting slurry while said direct current is passing therethrough to achieve contact between said element-ladened particles and the more negative electrode; and
   (e) recovering the hydride of the element from said slurry.

2. A process according to claim 1 in which the element is distributed on the electrically conductive particles as small isolate sites on the surfaces of said particles.

3. A process according to claim 1 in which the electrically conductive particles are formed from conductors having a high hydrogen-over-voltage.

4. A process according to claim 1 in which the electrode particles are carbon particles.

5. A process according to claim 1 in which the electrolyte is non-aqueous.

6. A process according to claim 1 in which the slurry is agitated by dynamically flowing it against the more negative electrode element.

7. A method according to claim 1 in which porous barrier means are introposed between the electrode elements to isolate products formed at the respective electrodes without interfering with current flow through said electrolyte.

8. A process according to claim 1 in which the more negative electrode is a conductor having a high hydrogen-over-voltage.

9. A process according to claim 1 in which the more positive electrode undergoes solution in preference to oxygen evolution.

10. A process according to claim 9 in which the more positive electrode is zinc.

11. An improved process for the electro-chemical preparation of phosphine comprising:
    (a) distributing elemental phosphorus directly on electrically conductive particles as small isolated crystallitic sites;
    (b) slurrying the phosphorus-ladened particles with an electrolyte capable of furnishing hydrogen ions;
    (c) passing a direct current through the resulting slurry of said phosphorus-ladened particles and said electrolyte through electrode elements;
    (d) flowing said resulting slurry while said direct current is flowing therethrough in a manner which causes said phosphorus-ladened particles in said resulting slurry to contact the more negative of said electrode elements; and
    (e) recovering phosphine from said resulting slurry.

12. A process according to claim 11 in which the electrically conductive particles have a high hydrogen-over-voltage.

13. A process according to claim 11 in which the phosphorus is distributed on the electrically conductive particles by dissolving said phosphorus in a solvent, immersing said particles in said solvent containing the dissolved phosphorus, and thereafter evaporatng said solvent.

References Cited

UNITED STATES PATENTS 3,109,791  11/1963  Gordon _____ 204—101

FOREIGN PATENTS 889,639  2/1962  Great Britain.

JOHN H. MACK, *Primary Examiner.*

D. R. JORDAN, *Assistant Examiner.*